United States Patent
Lee et al.

(10) Patent No.: US 9,313,681 B2
(45) Date of Patent: Apr. 12, 2016

(54) METHOD AND APPARATUS FOR IN-DEVICE COEXISTENCE INTERFERENCE INFORMATION IN WIRELESS COMMUNICATION SYSTEM

(75) Inventors: Kyungjun Lee, Anyang-si (KR);
Sungjun Park, Anyang-si (KR);
Sunghoon Jung, Anyang-si (KR);
Youngdae Lee, Anyang-si (KR);
Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 13/981,265

(22) PCT Filed: Mar. 5, 2012

(86) PCT No.: PCT/KR2012/001611
§ 371 (c)(1),
(2), (4) Date: Jul. 23, 2013

(87) PCT Pub. No.: WO2012/124918
PCT Pub. Date: Sep. 20, 2012

(65) Prior Publication Data
US 2013/0301468 A1    Nov. 14, 2013

Related U.S. Application Data

(60) Provisional application No. 61/452,608, filed on Mar. 14, 2011.

(51) Int. Cl.
*H04B 15/00* (2006.01)
*H04W 24/10* (2009.01)

(52) U.S. Cl.
CPC ............... *H04W 24/10* (2013.01); *H04B 15/00* (2013.01)

(58) Field of Classification Search
CPC .. H04W 72/082; H04W 28/04; H04B 17/345; H04B 1/719; H04B 1/7097; H04B 1/7103; H04B 1/71075
See application file for complete search history.

(56) References Cited

U.S. PATENT DOCUMENTS

| | | | |
|---|---|---|---|
| 8,014,785 B2* | 9/2011 | Zhao et al. | 455/452.2 |
| 8,165,168 B2* | 4/2012 | Lusky et al. | 370/503 |
| 8,842,602 B2* | 9/2014 | Koo et al. | 370/326 |
| 2009/0047914 A1 | 2/2009 | Axness et al. | |

OTHER PUBLICATIONS

Choi et al., "Analysis on Multiple Access for Heterogeneous Network Diversity," 2009 IEEE 69th Vehicular Technology Conference, Apr. 29, 2009, 5 pages.
Farnham et al., "Collaborative Radio Resource Management for Femto-Cell Networks," 2010 Future Network and Mobile Summit Conference Proceedings, Jun. 2010, 7 pages.

* cited by examiner

*Primary Examiner* — Ayaz Sheikh
*Assistant Examiner* — Debebe Asefa
(74) *Attorney, Agent, or Firm* — Birch, Stewart, Kolasch & Birch, LLP (57) ABSTRACT

A method for transmitting interference information at a mobile station in a wireless communication system is disclosed. The method comprises detecting a change of interference information associated with a interference frequency; and transmitting a message including the interference information associated with the interference frequency to the network, if a timer configured based on the interference frequency is not running.

7 Claims, 8 Drawing Sheets

E-UMTS

(a) contol - plane protocol stack (b) user - plane protocol stack

METHOD AND APPARATUS FOR IN-DEVICE COEXISTENCE INTERFERENCE INFORMATION IN WIRELESS COMMUNICATION SYSTEM

This application is the National Phase of PCT/KR2012/001611 filed on Mar. 5, 2012, which claims priority under 35 U.S.C. 119(e) to U.S. Provisional Application No. 61/452,608 filed on Mar. 14, 2011, all of which are hereby expressly incorporated by reference into the present application.

TECHNICAL FIELD

The present invention relates to a wireless communication system, and more particularly to a method and apparatus for transmitting In-Device Coexistence (IDC) interference information in a wireless communication system.

BACKGROUND ART

As a representative example of a wireless communication system of the present invention, a 3rd Generation Partnership Project Long Term Evolution (3GPP LTE) communication system will hereinafter be described in detail.

Figure 1:
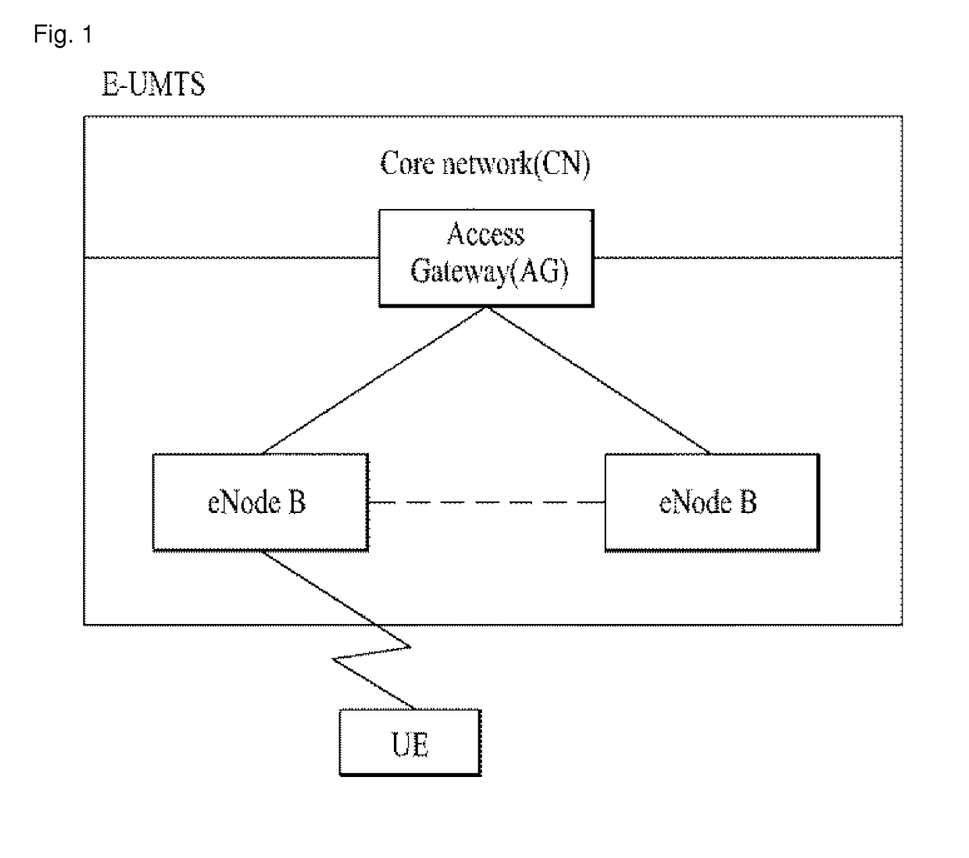
FIG. 1 is a conceptual diagram illustrating an Evolved Universal Mobile Telecommunications System (E-UMTS) network structure as an example of a wireless communication system.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARM)-related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new feature and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for the new or improved wireless access technology.

DISCLOSURE OF INVENTION

Technical Problem

Accordingly, the present invention is directed to a method and apparatus for transmitting IDC interference information in a wireless communication system that substantially obviate one or more problems due to limitations and disadvantages of the related art.

An object of the present invention devised to solve the problem lies on a method and apparatus for transmitting IDC interference information in a wireless communication system.

Solution to Problem

To achieve these objects and other advantages and in accordance with the purpose of the invention, as embodied and broadly described herein, in one aspect of the present invention, a method for transmitting interference information at a mobile station in a wireless communication system comprises detecting a change of interference information associated with a interference frequency; and transmitting a message including the interference information associated with the interference frequency to the network, if a timer configured based on the interference frequency is not running.

Preferably, the method further comprises receiving the timer from the network. More preferably, the method further comprises starting the timer after transmitting the message.

Further the interference information includes a value of the timer, and information on the interference frequency.

In another aspect of the present invention, a method for transmitting interference information at a mobile station in a wireless communication system comprises transmitting a first message including the interference information associated with a first interference frequency to the network; starting a first timer; and prohibiting a transmission of a second message including the interference information associated with the first interference frequency until the first timer is expired, though the interference information associated with the first interference frequency is changed. Preferably, the method further comprises configuring the first timer based on the first interference frequency or receiving the first timer from the network.

More preferably, the interference information includes a value of the first timer, and information on the first interference frequency.

Further, if detecting a second interference frequency, the method further comprises configuring a second timer based on the second interference frequency; transmitting a third message including the interference information associated with the second interference frequency to the network; and prohibiting a transmission of a fourth message including the interference information associated with the second interference frequency until the second timer is expired, though the interference information associated with the second interference frequency is changed.

Advantageous Effects of Invention

As can be seen from the embodiments of the present invention, a user equipment (UE) or a mobile station (MS) can effectively transmit IDC interference information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a 3rd Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary. In addition, although the embodiment of the present invention will be disclosed on the basis of an FDD scheme as an example, the scope or spirit of the embodiment of the present invention is not limited thereto and can also be applied to H-FDD and TDD schemes as necessary.

Figure 2:
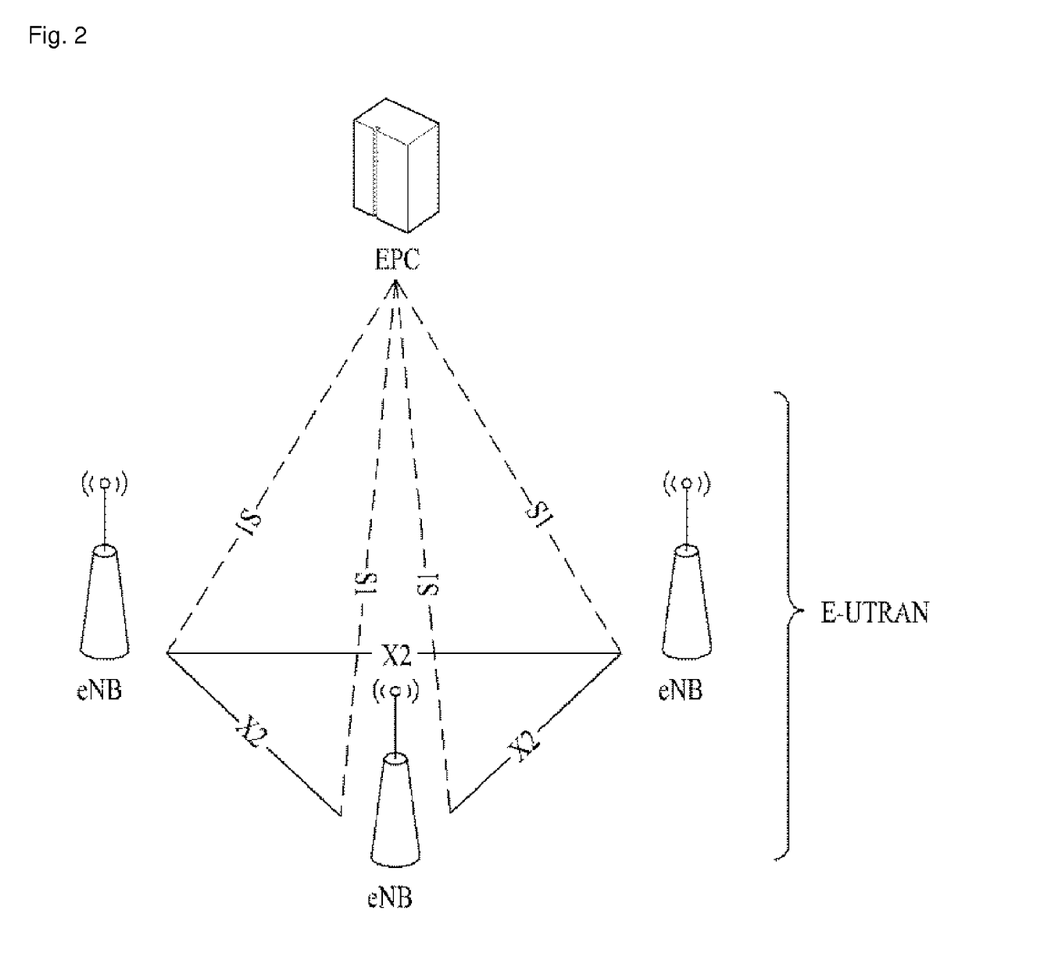
FIG. 2 is a conceptual diagram illustrating an Evolved Universal Terrestrial Radio Access Network (E-UTRAN) structure.

FIG. 2 is a conceptual diagram illustrating a network structure of an Evolved Universal Terrestrial Radio Access Network (E-UTRAN) system. Specifically, the E-UTRAN system is an evolved version of the conventional UTRAN system. The E-UTRAN includes one or more cells that will also be referred to as "eNode B(s)" or "eNB(s)". The eNBs are connected through an X2 interface. Each eNB is connected to the User Equipment (UE) through a radio interface and is connected to an Evolved Packet Core (EPC) through an S1 interface.

The EPC may include a Mobility Management Entity (MME), a Serving-Gateway (S-GW), and a Packet Data Network-Gateway (PDN-GW). The MME may include UE access information or UE capability information, and this information is generally adapted to manage UE mobility. The S-GW is a gateway in which the E-UTRAN is located at an end point, and the PDN-GW is a gateway in which a Packet Data Network (PDN) is located at an end point.

Figure 3:
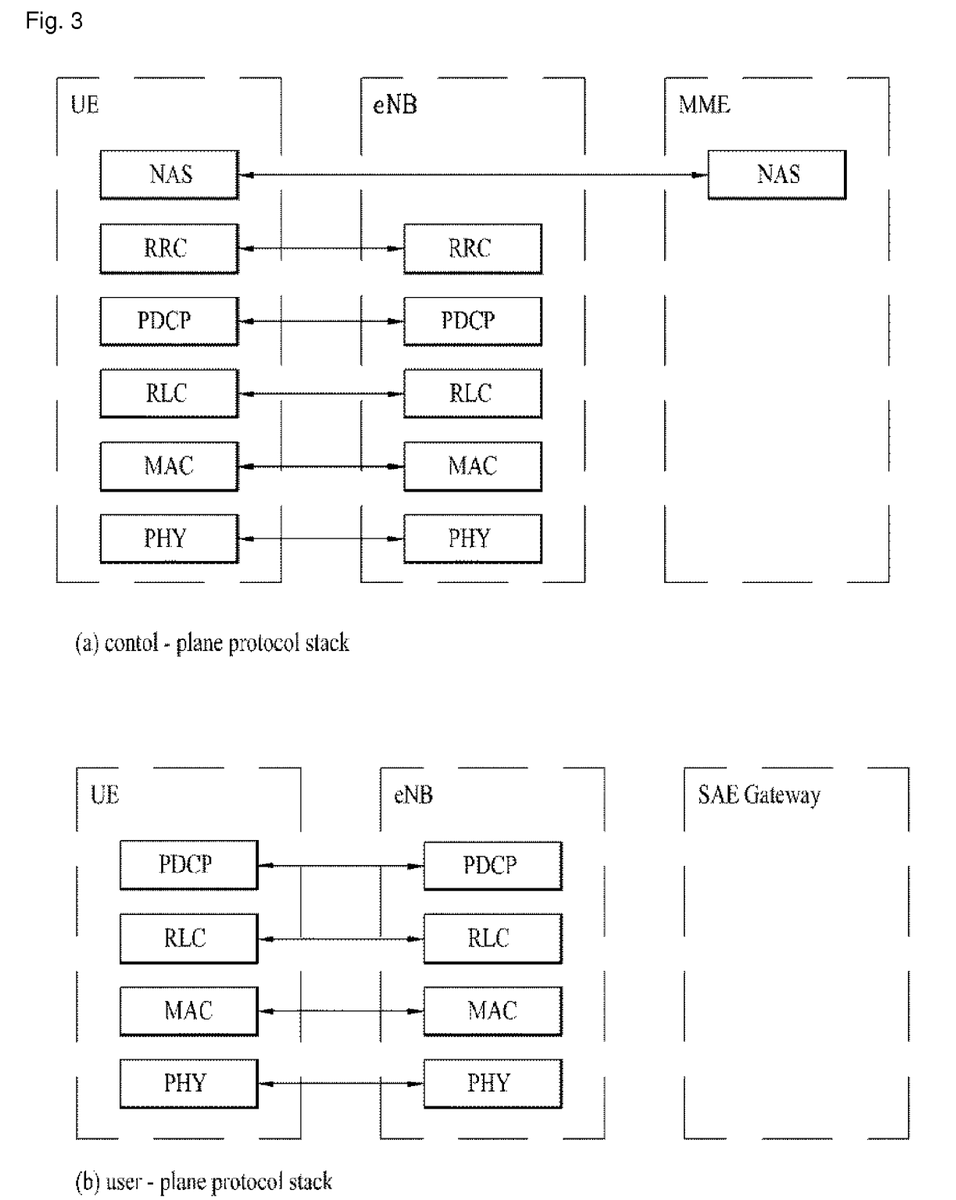
FIG. 3 illustrates a control plane and a user plane (U-Plane) of a radio interface protocol between a User Equipment (UE) and an E-UTRAN according to the 3GPP wireless access network standard.

FIG. 3 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH).

In the meantime, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

A detailed description will hereinafter be given of the RRC state and the RRC connection method, a UE's RRC state and its RRC connection method. The RRC state indicates whether a UE's RRC is logically connected to an E-UTRAN's RRC. If it is determined that the UE's RRC is logically connected to the E-UTRAN's RRC, this state is called an RRC connected (RRC_CONNECTED) state. If the UE's RRC is not logically connected to the E-UTRAN's RRC, this state is called an RRC idle (RRC_IDLE) state.

A UE under the RRC connected (RRC_CONNECTED) state has an RRC connection, such that the E-UTRAN can recognize the presence of the corresponding UE in units of a cell. As a result, the UE can be effectively controlled. Otherwise, a UE under an RRC idle (RRC_IDLE) state cannot be recognized by the E-UTRAN, but is controlled by a core network (CN) in units of a tracking area (TA) larger than the cell. In other words, if the UE under an RRC idle (RRC_IDLE) state desires to receive a general mobile communication service such as a voice or data service from the cell (eNB), the UE must enter the RRC connection state. Associated detailed description will hereinafter be described in detail.

If a user initially powers on his or her UE, the UE searches for an appropriate cell, and remains in an RRC_IDLE state in the searched cell. The UE in the RRC_IDLE state establishes an RRC connection in association with the E-UTRAN's RRC through an RRC connection procedure when it needs to establish the RRC connection, such that it is shifted to the RRC_CONNECTED state. The UE under the RRC_IDLE state must establish the RRC connection for a variety of reasons. For example, if uplink data transmission is needed when placing a call, or if a paging message is received from the E-UTRAN such that a response message to the paging message must be transmitted, the UE under the RRC_IDLE state needs to connect the RRC connection.

Terms "measurement" and "measurement report" will hereinafter be described.

In the following description, "measurement" may be defined to measure a quality value of the corresponding cell after receiving reference signals from inter-frequency cells, intra-frequency cells, and inter-RAT cells according to a measurement setting signal transferred from the network to the UE. In the following description, the term "quality" indicates a signal quality or cell quality recognized through a reference signal received from a cell serving as a measurement target.

In association with UE's mobility support in a mobile communication system, the UE persistently measures a quality of a serving cell providing a current service and a quality of a neighbor cell. For example, the UE measures qualities of the serving and neighbor cells at intervals of at least a discontinuous reception (DRX) period. The UE reports a cell-quality measurement result to the network at an appropriate time, and the network provides optimum mobility to the UE through handover or the like.

In order to support the UE mobility as well as to provide information needed for network management of an enterprise, the UE performs specific measurement established by the network, and reports the cell quality measurement result to the network. For example, the UE receives broadcast information of a specific cell decided by the network. The UE may report a cell identify (also called a global cell ID) of the specific cell, location identification information (e.g., a tracking area code) of the specific cell, and/or other cell information (e.g., indicating a member or non-member of a Closed Subscriber Group (CSG) cell to a serving cell.

If the moving UE confirms a poor quality of a specific region through measurement, and may report location information and cell-quality measurement results of poorquality cells to the network. The network may optimize the network on the basis of the cell-quality measurement result of UEs assisting network management.

In a mobile communication system having a frequency reuse factor of 1, mobility is mostly performed between different cells existing in the same band. Therefore, in order to guarantee the UE mobility, the UE has to well measure not only a quality of each neighbor cell having the same intermediate frequency as that of the serving cell, but also each cell information. In this way, measurement of a cell that has the same intermediate frequency as that of the serving cell is referred to as intra-frequency measurement. The UE performs intra-frequency measurement, and reports the cell quality measurement result to the network at an appropriate time, such that the quality measurement result of the corresponding cell can be achieved.

A mobile communication enterprise may operate and manage the network using a plurality of frequency bands. In order to guarantee the UE's optimum mobility under the condition that a service of the communication system is provided through multiple frequency bands, the UE has to thoroughly measure not only the quality of each neighbor cell having an intermediate frequency different from that of the serving cell but also each cell information. Likewise, measurement of a cell having an intermediate frequency different from that of the serving cell is referred to as inter-frequency measurement. The UE performs inter-frequency measurement such that it has to report the cell quality measurement result to the network at an appropriate time.

If the UE supports measurement of a heterogeneous network, it may measure the heterogeneous cell according to BS or eNB setting. The heterogeneous network measurement is referred to as inter-RAT (inter ? Radio Access Technology) measurement. For example, RAT may include UTRAN (UMTS Terrestrial Radio Access Network) and (GSM EDGE Radio Access Network (GERAN) that are based on the 3GPP standard specification. If necessary, the RAT may further include a CDMA 200 system based on the 3GPP2 standard specification.

The terms "In-Device Coexistence (IDC)" and "IDC interference" will be described below.

In order to the user to freely access the network anywhere and anytime, there is a need for one UE to include not only a transceiver for wireless communication systems (e.g., LTE, WiFi, Bluetooth BT, etc.) but also a Global Navigation Satellite System (GNSS) receiver. As described above, the above state in which different wireless communication systems coexist in only one UE is referred to as In-Device Coexistence (IDC). For example, a UE that includes an LTE and a BT module to receive a VoIP service and a multimedia service using a BT earphone, a UE that includes LTE and WiFi modules for traffic distribution, or a UE that includes GNSS and LTE modules to further acquire location information may be used.

Figure 4:
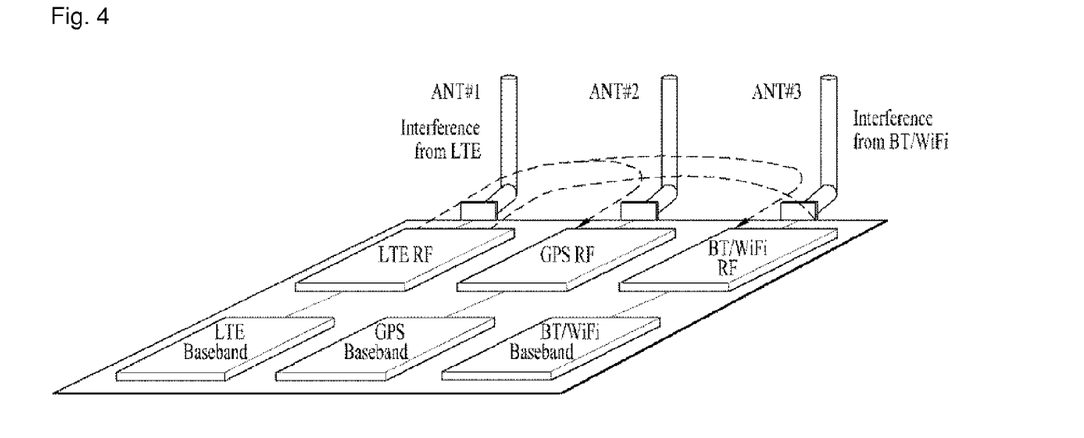
FIG. 4 shows a user equipment (UE) including radio frequency (RF) modules for an LTE system, a Global Positioning System (GPS), and a BT/WiFi system.

FIG. 4 shows a user equipment (UE) including radio frequency (RF) modules for an LTE system, a Global Positioning System (GPS), and a BT/WiFi system;

Referring to FIG. 4, since multiple transceivers are located close to each other within one UE, power of a signal transmitted from one transmitter may be higher than that of a signal received in another receiver. If there may occur interference between different communication modules, this interference may be referred to as IDC interference. If IDC interference becomes serious, there may occur the ping-pong phenomenon in which the UE continuously attempts to perform handover irrespective of connection to a base station (BS) or eNB.

Generally, the communication modules operate in neighbor or contiguous frequencies in terms of a frequency, thereby causing mutual interference.

The LTE module may operate in TDD Band 40 (2300 MHz~2400 MHz), the WiFi or Bluetooth module may operate in an unlicensed band (2400 MHz~2483.5 MHz). In this case, transmission in the LTE module may cause interference to the WiFi or Bluetooth module, and transmission in the WiFi or Bluetooth module may cause interference to reception of the LTE module.

In addition, the LTE module may perform uplink transmission in FDD Band 7 (2500 MHz~2700 MHz), and the Bluetooth module may operate in the unlicensed band (2400 MHz~2483.5 MHz). In this case, uplink transmission of the LTE module may cause interference to reception of the WiFi or Bluetooth module.

In addition, the LTE module may operate in FDD Band 13 (UL: 777-787 MHz, DL: 746-756 MHz) or in FDD Band 14 (UL: 788-798 MHz, DL: 758-768 MHz), and the GPS module may receive location information at 1575.42 MHz. In this case, UL transmission of the LTE module may cause interference to location information reception of the GPS module.

According to one of the solutions for obviating the above-mentioned problem, a sufficient number of physical filters or a sufficient interval between frequencies of Tx/Rx signals may be guaranteed, such that the above solution can prevent the occurrence of IDC interference between two transceivers. However, if multiple RF modules operate in neighbor or contiguous frequencies, it is true that the current filter technology has difficulty in achieving sufficient interference suppression.

Separately from a method for using a physical filter technique, the following three cases (i.e., the first and third methods) may be used according to either information indicating the presence or absence of coordination between an LTE module and another coexisting communication module, or information indicating the presence or absence of coordination for deleting IDC interference between an LTE module and a BS.

According to the first method, there is no coordination for IDC interference cancellation between communication modules coexisting in one UE or between the LTE module and the BS. In the case of the first method, the LTE module is unable to recognize information regarding other coexisting communication modules.

According to the second method, only coordination between coexisting communication modules is present in the UE. In this case, it is possible to recognize an operation state (i.e., ON/OFF state) of the coexisting modules, a traffic transmission state, etc.

According to the third method, not only coordination between the coexisting modules but also coordination between the UE and the BS may exist. The LTE module may measure IDC interference not only using coordination of other modules but also using inter/intra frequency measurement.

Various solutions for solving IDC interference have been discussed in the current 3GPP, for example, 1) FDM (Frequency Division Multiplexing) method in which a communication module causing interference or a communication module receiving interference changes a current frequency to another frequency; 2) TDM (Time Division Multiplexing) method in which the coexisting communication modules uses a single frequency using TDM; and 3) LTE PC (LTE Power Control) method in which an LTE module adjusts Tx power to reduce interference applied to other coexisting modules. Detailed methods and procedures of the above-mentioned first to third cases are being discussed.

In order to efficiently operate the above-mentioned IDC interference control scheme, there is needed a cooperative network. In other words, a variety of coordination or cooperations are needed, for example, a handover in which a frequency for avoiding IDC interference is handed over to another frequency, coordination such as eNB scheduling for divisionally utilizing time resources, etc. IDC interference occurs in one UE, such that the eNB has difficulty in recognizing the IDC interference. As a result, if IDC interference occurs or if there is a high possibility of generating such IDC interference information, the UE transmits the IDC interference information to the eNB. In addition, in other cases, for example, if IDC interference disappears, the UE must also transmit the IDC interference information to the eNB.

However, if appearance or disappearance of IDC interference persistently occurs, the UE must transmit all IDC interference-associated information to the eNB, resulting in the occurrence of signaling overhead.

First Embodiment

The first embodiment for obviating the above-mentioned problems provides a method for allowing the UE to operate a timer when interference frequency information is transmitted to the network, as well as not to transmit interference frequency information to the network although an interference frequency situation is changed before expiration of the timer.

Figure 5:
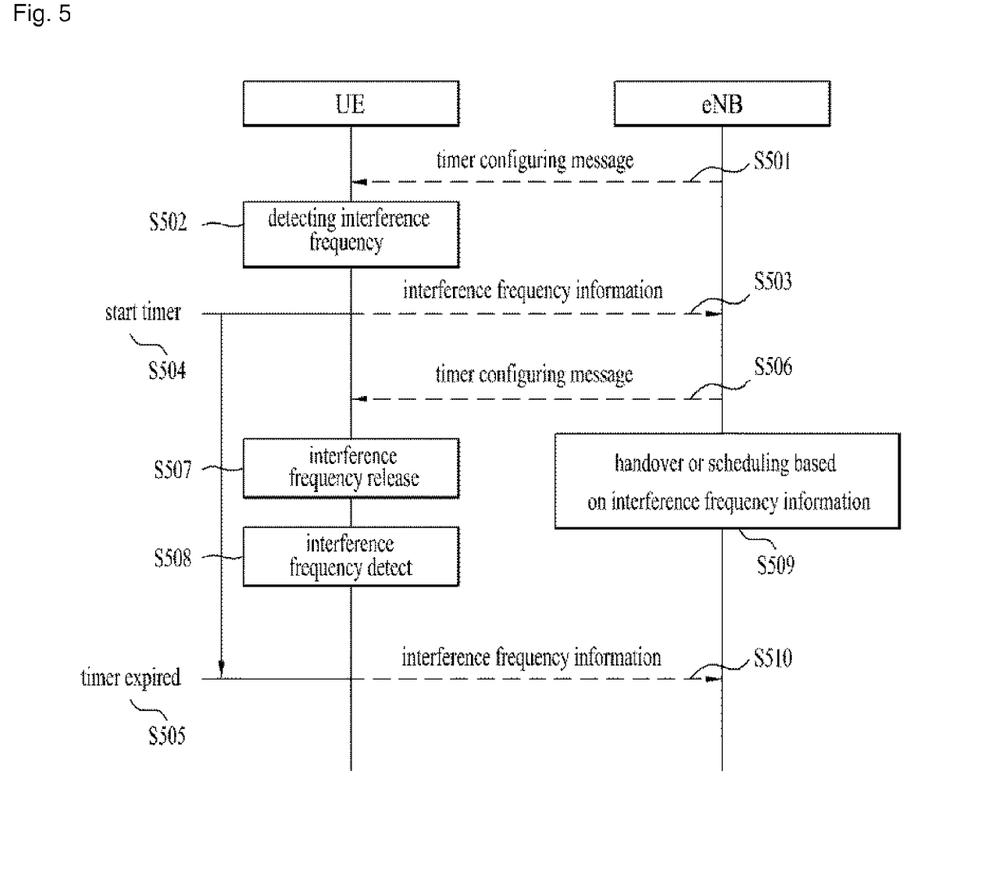
FIG. 5 is a flowchart illustrating a method for transmitting IDC interference information according to a first embodiment of the present invention.

FIG. 5 is a flowchart illustrating a method for transmitting IDC interference information according to a first embodiment of the present invention.

Referring to FIG. 5, a network, i.e., an eNB, transmits a timer configuration message for prohibiting interference information transmission to a user equipment (UE) in step S501. The timer configuration message may include a timer value, or may be contained in legacy RRC messages (for example, an RRC connection setup message, an RRC connection re-establishment message, an RRC connection reconfiguration message, etc.). Needless to say, an RRC message for configuring IDC interference information may be defined separately. The above-mentioned configuration message may be transmitted after receiving interference frequency information from the UE, or may be transmitted to the UE before receiving such interference frequency information. Alternatively, a predefined value may be used irrespective of transmission and reception of the timer configuration message.

If the UE detects the interference frequency in step S502, it transmits interference frequency information to the eNB in step S503. In this case, after transmitting the interference frequency information, the UE starts operating the timer in step S504. Meanwhile, various references for interference frequency discovery may be used. For example, a case in which interference of a specific threshold value or higher is detected at the corresponding frequency, and a case in which interference is expected by an operation of a transceiver contained in the UE may be used as the above-mentioned references.

Provided that the UE does not receive the timer configuration message from the eNB, the UE may start operating the timer using a predefined value, or may start operating a prohibition timer upon receiving a prohibition timer configuration message after completion of interference information transmission in step S506. Further, provided that the UE starts operating the timer simultaneously while transmitting interference information, and the UE receives a new timer configuration message before expiration of the timer, the legacy operating timer may be updated according to a new configuration value.

During operation of the timer, the UE does not re-transmit interference frequency information irrespective of whether interference of the corresponding interference frequency is changed in steps S507 and S508. Of course, provided that IDC interference occurs in a frequency different from a frequency contained in interference frequency information, the interference frequency information is re-updated and transmitted to the network.

In step S509, the eNB performs handover or scheduling on the basis of the interference frequency information having received at step S503, such that IDC interference is mitigated or removed. For example, provided that the UE currently communicates with the eNB using an interference frequency, it may be handed over using a different frequency or may change scheduling of LTE transmission/reception. Alternatively, the degree of interference may be reduced by adjustment of transmission (Tx) power. Provided that the interference frequency reported by the UE indicates a frequency of a neighbor (or contiguous) eNB, handover to the corresponding frequency may not be considered or the UE need not periodically measure the strength of a signal of the neighbor eNB.

Finally, if the timer has expired in step S505, the UE rechecks an interference frequency. Provided that the interference frequency is detected, the UE transmits interference frequency information to the network.

Figure 6:
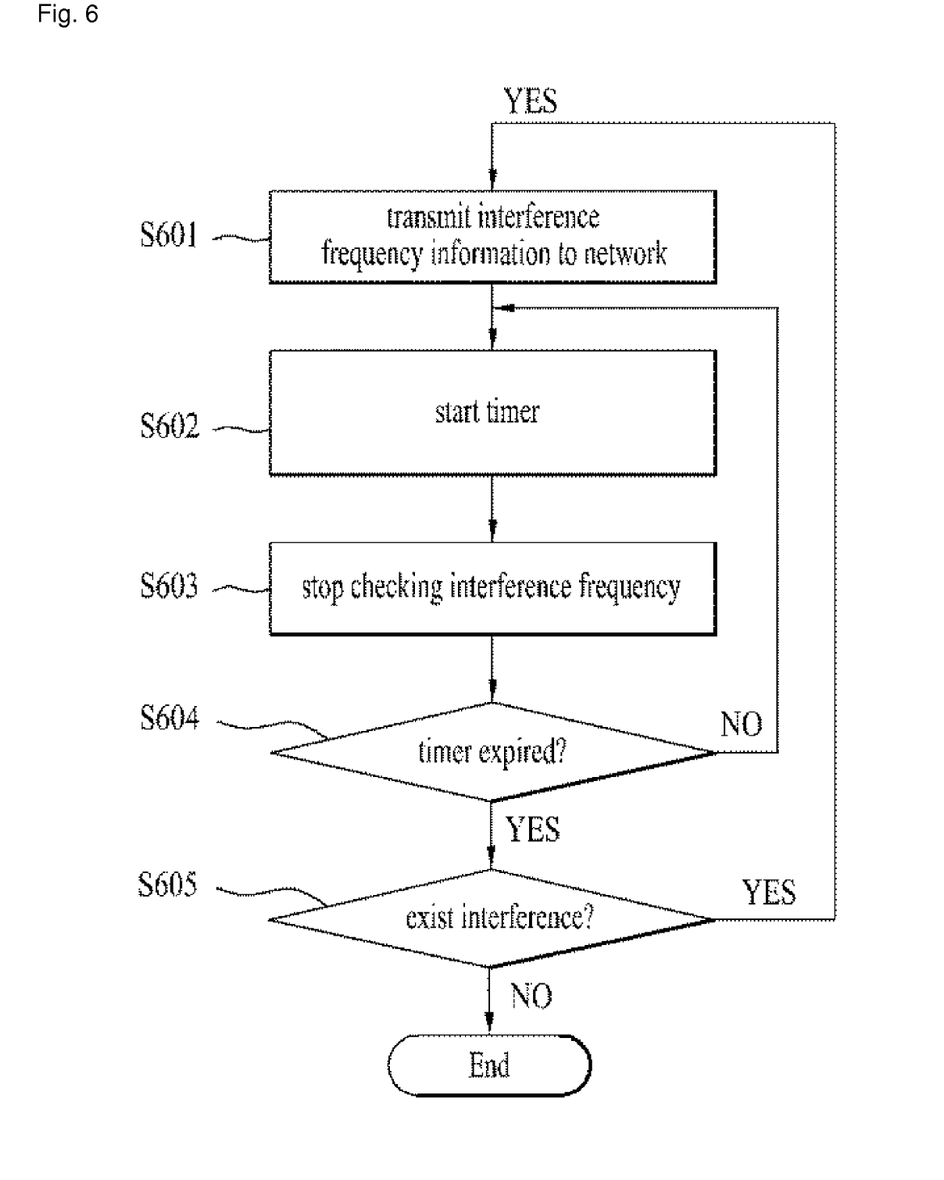
FIG. 6 is a flowchart illustrating a method for transmitting IDC interference information by an UE according to a first embodiment of the present invention.

FIG. 6 is a flowchart illustrating a method for transmitting IDC interference information by an UE according to a first embodiment of the present invention.

Referring to FIG. 6, assuming that interference occurrence at a specific frequency is expected or interference has occurred at the specific frequency in step S601, the corresponding interference frequency information is transmitted to the network. In addition, after transmitting the interference frequency information to the network, the UE sets and operates the timer corresponding to the corresponding interference frequency information. A timer configuration message for the above-mentioned interference information may be previously received from the network, or time configuration of the corresponding information may be downloaded by the network having received interference information. Alternatively, a basic value may be used as the timer configuration.

Continuously, during the operation time of the timer, the UE does not retransmit interference frequency information irrespective of the change of the corresponding interference frequency information in step S603. Preferably, if the interference problem occurs at a frequency not contained in the transmitted interference information, or if it is expected that the interference problem will occur, the interference frequency information may be updated and transmitted to the network. In addition, during the operation time of the timer, the operation for checking whether the interference problem occurs at the corresponding interference frequency may be paused to reduce power consumption of the UE.

Finally, if the timer has expired in step S604, the UE rechecks whether interference occurs at the corresponding frequency. If interference has occurred at the corresponding frequency, the UE returns to step S601, such that it transmits interference frequency information to the network and starts operating the timer in step S601.

In accordance with the first embodiment of the present invention, under the condition that the IDC situation is frequently changed because the timer for IDC interference information transmission from the network to the UE is established, the first embodiment can prevent repeated transmission of IDC interference information during a short period of time.

Second Embodiment

In accordance with the second embodiment of the present invention, under the condition that the UE transmits interference frequency information to the network, the UE establishes a timer or valid time for the corresponding information, and reports the established information to the network. The above-mentioned valid time indicates a valid time of the transmitted interference frequency information. If the valid time has expired, the corresponding interference frequency information is deleted.

Figure 7:
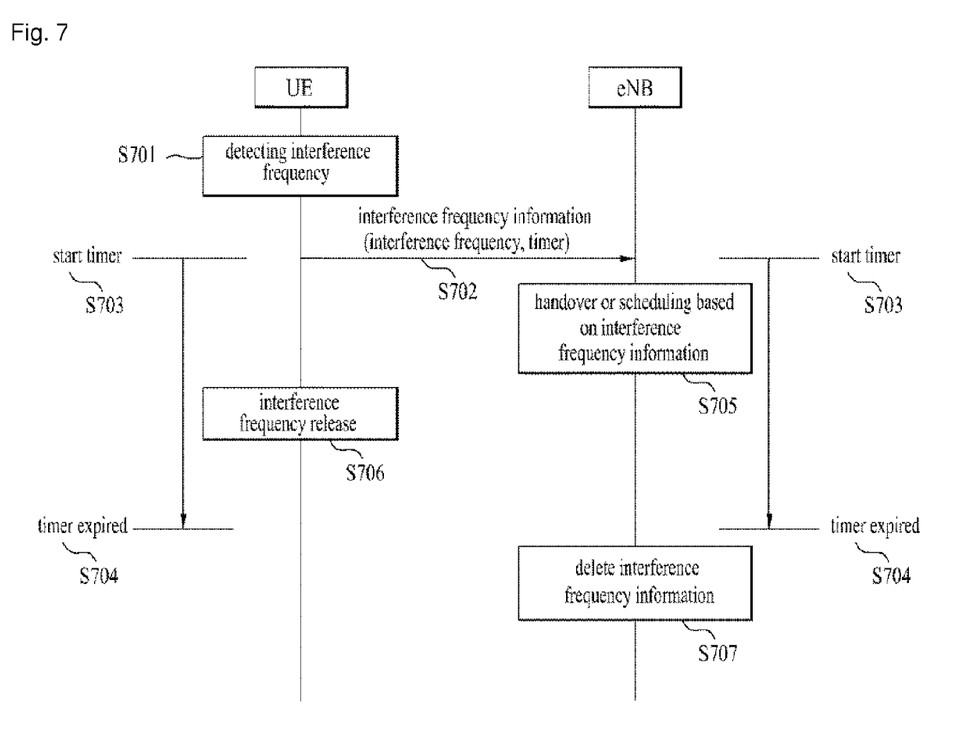
FIG. 7 is a flowchart illustrating a method for transmitting IDC interference information according to a second embodiment of the present invention.

FIG. 7 is a flowchart illustrating a method for transmitting IDC interference information according to a second embodiment of the present invention.

Referring to FIG. 7, if the UE detects an interference frequency in step S701, it transmits interference frequency information to the eNB in step S702. In this case, the interference frequency information may be transmitted through an RRC message and may include the following information 1) to 5).

1) LTE system frequency—LTE system frequency causes interference (or may be highly possible to generate interference) by communication of other communication transceivers contained in the UE.

2) Frequency—Frequency causes interference (or may be highly possible to generate interference) to communication of other communication Tx/Rx modules contained in the UE by signal transmission/reception of the LTE module.

3) Interference traffic pattern ? Network can employ pattern information of interference traffic during scheduling of the corresponding UE so as to prevent interference from being generated.

4) Interference signal strength

) Valid Time ? The valid time information may have a different value according to categories of RF modules such as BT, WLAN, GPS, etc. causing IDC interference. Alternatively, the valid time may have a different value according to purpose-, service- and traffic-characteristics of BT, WLAN, GPS, etc.

Continuously, the UE having transmitted interference information configures and operates the timer using the valid time in step S703. In this way, the network having received the interference information configures and operates the timer using a valid time in the same manner as in step S703. In step S705, the network can perform the operation for reducing influence of the interference frequency for the corresponding UE on the basis of interference frequency information during the valid time.

For example, if the UE is currently in a communication mode at an interference frequency, it may be handed over to another frequency or may change scheduling of LTE transmission/reception. Alternatively, the UE can reduce interference by adjusting Tx power. Provided that the interference frequency reported by the UE is identical to a frequency of the neighbor eNB, handover to the corresponding frequency may not be considered or the UE need not periodically measure the strength of a signal of the neighbor eNB.

During the valid operation time of the timer, the UE having transmitted the above interference information does not retransmit interference frequency information to the network, irrespective of information indicating interference or non-interference of the corresponding interference frequency. Preferably, provided that the interference problem occurs at a frequency different from a frequency contained in interference information, the UE may again update the interference information and transmit it to the network.

If the valid timer has expired in step S704, the network having received the interference information deletes frequency interference information for the corresponding UE in step S707, such that the corresponding interference frequency information is no longer valid when handover or scheduling of the corresponding UE is decided.

If the timer has expired in step S704, the UE having transmitted the interference information re-checks the presence or absence of interference of the corresponding frequency. Provided that interference is continuously valid, the interference frequency information and the valid time can be simultaneously transmitted to the network. If necessary, the valid time may have another value different from a previous value according to situations.

Figure 8:
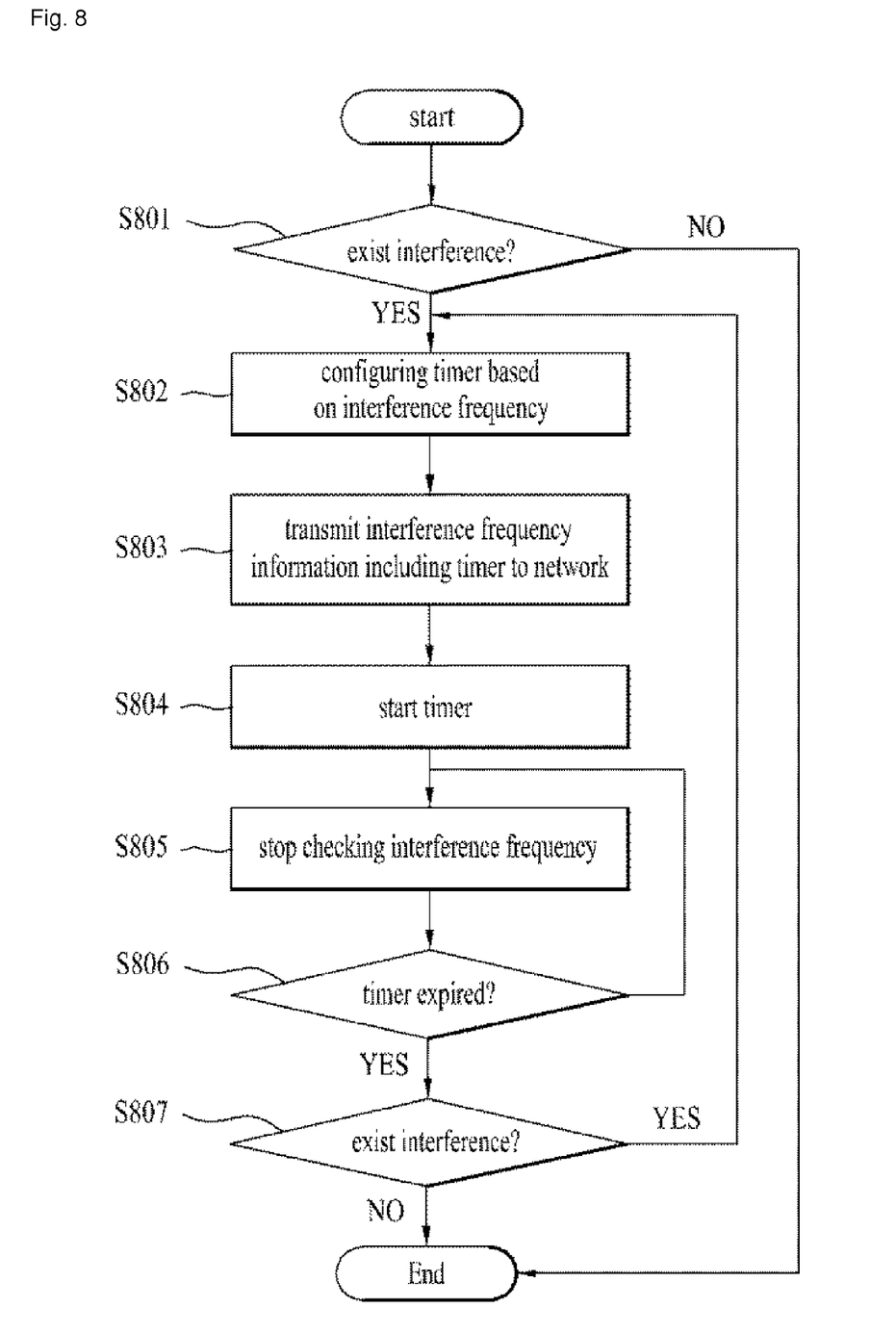
FIG. 8 is a flowchart illustrating a method for transmitting IDC interference information by an UE according to a second embodiment of the present invention.

FIG. 8 is a flowchart illustrating a method for transmitting IDC interference information by an UE according to a second embodiment of the present invention.

Referring to FIG. 8, the UE determines whether interference occurs at a specific frequency in step S801. That is, if interference has occurred or if it is expected that interference will occur, the UE configures the timer on the basis of the interference frequency in step S802.

Continuously, the UE transmits not only the timer value but also interference frequency information to the network in step S803, and starts operating the timer in step S804. If the timer value is not transmitted, the UE may operate the timer using a predetermined basic value.

The UE determines that interference has occurred at the corresponding frequency during the operation time of the timer associated with interference frequency information notified to the network. Although interference or non-interference of the frequency contained in the transmitted interference information is changed, the UE does not retransmit the interference frequency information. Preferably, if the interference problem has occurred at a frequency not contained in the transmitted interference information or if it is expected that the interference problem will occur at the same frequency, the UE may update the interference frequency information and transmit it to the network.

During the operation time of the timer, the operation for confirming whether interference occurs may be stopped to reduce power consumption of the UE.

If the timer has expired in step S806, the UE determines whether interference still exists at the corresponding frequency in step S807. If the existence of interference at the corresponding frequency is decided, the UE re-performs steps S802 and S803.

Figure 9:
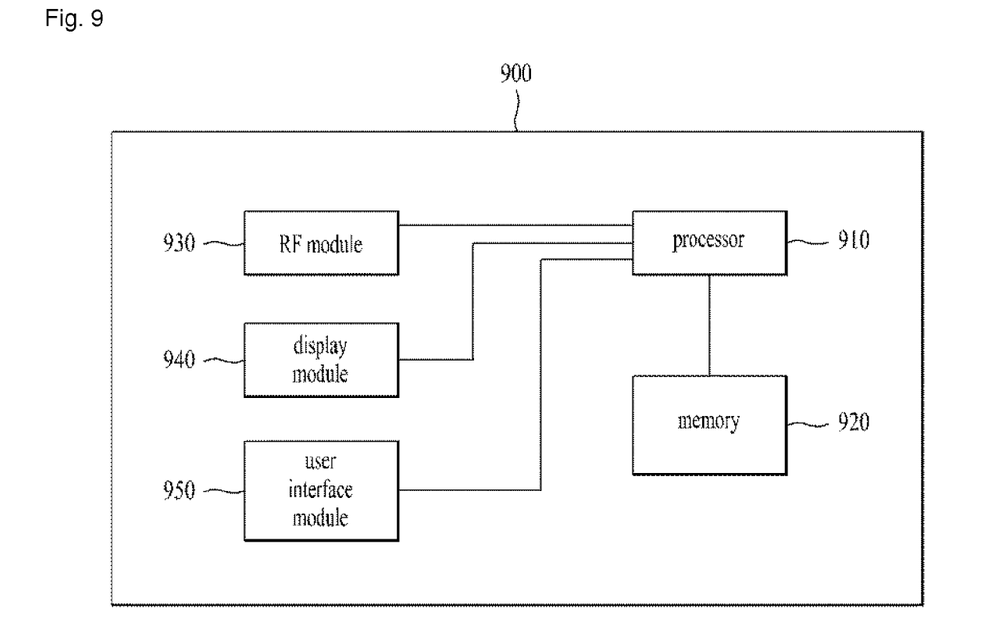
FIG. 9 is a block diagram illustrating a transceiver according to one embodiment of the present invention.

FIG. 9 is a block diagram illustrating a communication transceiver according to one embodiment of the present invention. In FIG. 9, the transceiver may be a part of the eNode-B or a part of the UE.

Referring to FIG. 9, the transceiver 900 includes a processor 910, a memory 920, a Radio Frequency (RF) module 930, a display module 940, and a user interface (UI) module 950.

The transceiver 900 is disclosed only for illustrative purposes, and certain modules may also be omitted from the transceiver 900 as necessary. In addition, the transceiver 900 may further include necessary modules. Some modules of the transceiver 900 may be identified as more detailed modules. The processor 910 is configured to carry out the operations of the embodiments of the present invention.

In more detail, if the transceiver 900 is a part of the eNode-B, the processor 910 can generate a control signal, and map the generated control signal to a control channel established in several frequency blocks. In addition, if the transceiver 900 is a part of the UE, the processor 910 confirms an indicated control channel upon receiving a signal from several frequency blocks, and extracts a control signal from the confirmed control channel.

Thereafter, the processor 910 may perform a necessary operation on the basis of the control signal. For detailed operations of the processor 910 reference may be made to FIGS. 1 to 8.

The memory 920 is connected to the processor 910, and stores an operating system, an application, program code, data and the like. The RF module 930 is connected to the processor 910, converts a baseband signal into a radio frequency (RF) signal, or converts the RF signal into the baseband signal. For these operations, the RF module 930 performs analog conversion, amplification, filtering, and frequency up-conversion in order or performs such operations in reverse order. The display module 940 is connected to the processor 910 and displays a variety of information. The scope or spirit of the display module 940 of the present invention is not limited thereto, and the display module 940 may be any of well-known elements, for example, a Liquid Crystal Display (LCD), a Light Emitting Diode (LED), an Organic Light Emitting Diode (OLED) and the like. The user interface (UI) module 950 is connected to the processor 910, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

MODE FOR THE INVENTION

Various embodiments have been described in the best mode for carrying out the invention.

INDUSTRIAL APPLICABILITY

As is apparent from the above description, although the above-mentioned method and apparatus for transmitting IDC interference information in a wireless communication system have been disclosed on the basis of application to the 3GPP LTE system, the inventive concept of the present invention is applicable not only to the 3GPP LTE system, but also to other mobile communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting interference information at a mobile station in a wireless communication system, the method comprising:

transmitting a first message including interference information associated with a first interference frequency to a network, wherein the interference information includes information on the first interference frequency;

starting a timer, wherein transmission of a second message including the interference information associated with the first interference frequency is prohibited until the timer is expired, and wherein the interference information associated with the first interference frequency is changed; and if the interference information associated with a second interference frequency is changed, transmitting the second message including the interference information associated with the second interference frequency regardless of whether the timer is expired or not, wherein each of the first message including the interference information associated with the first interference frequency and the second message including the interference information associated with the second interference frequency includes a valid time of the interference information, wherein the network deletes the interference information when the valid time has expired, and wherein the valid time has a different value according to a type of a radio frequency module related to the interference information.

2. The method according to claim 1, further comprising: configuring the timer for the first interference frequency.

3. The method according to claim 1, further comprising: receiving the timer from the network.

4. The method according to claim 1, wherein the interference information associated with the first interference frequency includes a value of the timer.

5. A mobile station for transmitting interference information in a wireless communication system, the mobile station configured to:

transmit a first message including interference information associated with a first interference frequency to a network, wherein the interference information includes information on the first interference frequency;

start a timer, wherein transmission of a second message including the interference information associated with the first interference frequency is prohibited until the timer is expired, and wherein the interference information associated with the first interference frequency is changed; and if the interference information associated with a second interference frequency is changed, transmit the second message including the interference information associated with the second interference frequency regardless of whether the timer is expired or not, wherein each of the first message including the interference information associated with the first interference frequency and the second message including the interference information associated with the second interference frequency includes a valid time of the interference information, wherein the network deletes the interference information when the valid time has expired, and wherein the valid time has a different value according to a type of a radio frequency module related to the interference information.

6. The mobile station of claim 5, where the timer is configured for the first interference frequency.

7. The mobile station of claim 5, wherein an operation for confirming whether interference occurs is stopped to reduce power consumption of the mobile station while the timer is operating.

* * * * *